Dec. 2, 1941.    L. AMBROSE    2,264,282

ACTUATOR

Filed Oct. 27, 1939

LOUIS AMBROSE.
INVENTOR.

BY Herbert H. Smith
ATTORNEY.

WITNESS:

Patented Dec. 2, 1941

2,264,282

UNITED STATES PATENT OFFICE 2,264,282

ACTUATOR

Louis Ambrose, New York, N. Y., assignor, by direct and mesne assignments, of one-third to Aldo M. Franchi, New York, one-third to John J. Seroska, Woodside, Long Island, and one-third to Anthony V. Stone, Jackson Heights, N. Y.

Application October 27, 1939, Serial No. 301,639

2 Claims. (Cl. 60—54.6)

This invention pertains to actuators of the bellows type particularly to actuators employed for use in elevated pressure operating devices, and more particularly to operating means where there is apparent distortion of the bellows when in operation.

Heretofore, actuators of the bellows type were used where operation was desired for simple expansion even under high pressures, but they were unsuitable for practical purposes where vibration excessively presented itself, or where one end of the actuator remained substantially stationary while the other end was caused to move appreciably from axial alignment, since the bellows was forced to move laterally and thereby provoke practical difficulties in commercial problems.

The present invention utilizes telescoping guide members which not only keep the bellows in proper alignment but act as adjustment means partially where it becomes necessary to have a portion of the adjusting means within the bellows for compactness. The guide means also act as a limiting means to prevent the bellows from being distorted appreciably since any lateral motion of the bellows in its central portion would be restricted by coming in contact with one of the surfaces of the telescoping member or members.

An object of this invention is to provide an actuator having guide means to keep the bellows in substantial axial alignment.

A further object is the provision of a bellows having adjustment means and locking means within its confines.

A further object is to provide an actuator of the class described having telescoping guide members with a working fit therebetween with one of the guide members having a plunger face to assist in operation thereof.

Figure 1:
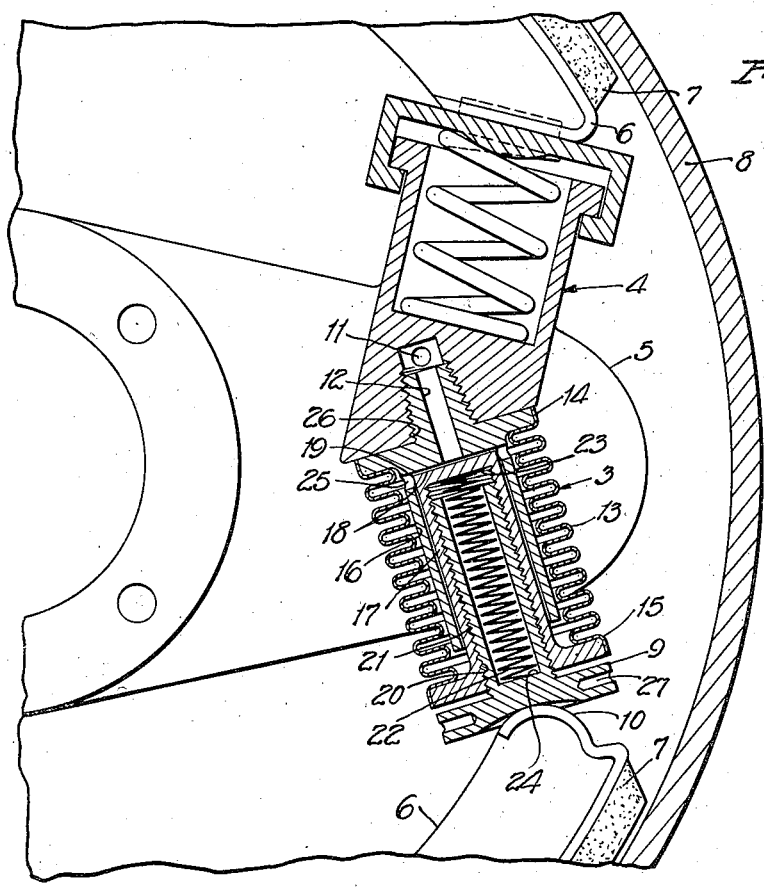
Fig. 1 is a sectionalized view of the invention as it may be applied in practice.
Figure 2:
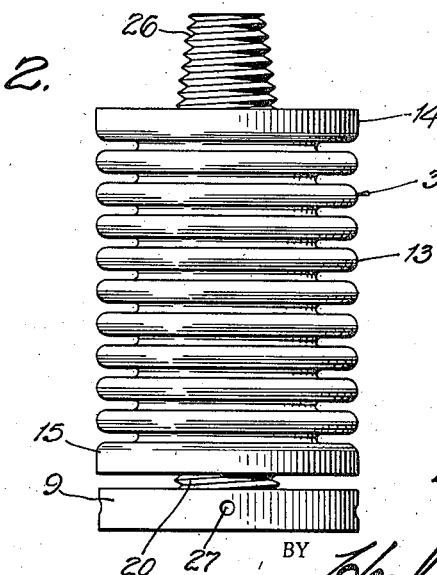
Fig. 2 is a front view of the invention per se.

Referring to the drawing and particularly Fig. 1, the actuator is shown as being used on a vehicle brake. The actuator 3 has one end thereof screwed into a housing 4 which is securely connected to a bracket 5, while the housing 4 is used to cooperate with a sliding brake shoe 6, having lining 7, which lining impinges the brake drum 8 when the brake is applied. The movable end of the actuator has an adjustment member 9, which engages the arcuate shoe end 10, which in turn exerts force on the brake shoe 6, when air or liquid pressure is forced through the openings 11 and 12 into the actuator chamber. The stationary end of the actuator has a threaded member 26 which is screwed into the housing 4 and is tapered to insure a good seal against pressure leaks.

The actuator proper has a bellows 13 which is expandable, the bellows having cup necks 14 and 15 on opposite ends thereof, which cup necks are secured by any suitable means such as welding or pressure fitting, to the shoulders of the telescoping female end member 16, and the male end member 17. The male end member 17, has a solid face 18 which may engage face 19 of the female member 16 when the telescoping members are in inoperative position substantially as shown.

The adjusting member 9 has a threaded portion 20 which engages the threads 21 on the inside of the male member 17. Spring 22 works in the hollow part of the adjusting member 9, and tends to hold the adjusting member 9 in a fixed position by its expanding force which increased the friction on the threads 21 and 22 as the spring ends engage the surfaces 23 and 24. The openings 27 in member 9 is to permit use of a special tool when required for adjustment.

The ports or openings 25, permit the fluid to pass between surfaces 18 and 19 into the bellows.

In operation it will be seen that when fluid pressure is applied through the opening 11, the bellows will expand and cause the brake to be operated by bringing the brake shoe lining 7, against the drum 8. The male and female telescoping members have a working fit therebetween so that they act as guide members to maintain the bellows in proper alignment when operating under elevated pressures particularly where there is an appreciable amount of shock, vibration or apparent distortion.

The actuator is shown having one end thereof stationary and the other end movable, but it is pointed out that both ends may be floating where it is required, since the invention is for the actuator per se and not for a particular use. The brake showing is merely for the purpose of illustration.

The bellows may be made of any suitable material but preferably of metal, and the guide means may be straight or curved to suit requirements.

While specific details of the invention are presented herewith it is to be understood that various equivalent parts may be utilized to supplement those indicated therein, and the invention is not confined to the specific showing as changes and alterations may be and may become apparent to those skilled in the art without departing from the spirit thereof as defined by the appended claims.

Having thus described the invention, which I claim as new and desire to secure by Letters Patent of the United States is:

1. A construction of the character described comprising a fluid-responsive actuator having a bellows for effecting relative movement between two parts, one of said parts having a threaded passage through which fluid under pressure may be supplied, said actuator having end members in sealed connection with the respective ends of said bellows and one of said end members having a threaded part with a passage through the latter communicating with the interior of the bellows, said one end member having rigid means extending therefrom in the direction of the other end member, said threaded part being in threaded connection with said threaded passage for thereby fixing the position of said one end member with its said rigid means relative to said one part and for thereby placing the interior of the bellows in communication with fluid under pressure, and said other end member having rigid means extending toward said one end member and telescoping with the rigid means of the latter for guiding said bellows during expansion or contraction along the line of telescopic movement between said two rigid means, said other end member having means forming an operating connection with said other of said two parts.

2. A construction as claimed in claim 1 in which said means forming an operating connection between said other end member and said other part comprises means telescopically interrelated with the rigid means of said other end member and means for fixing the relative position of one to the other.

LOUIS AMBROSE.